United States Patent
Sakamoto (10) Patent No.: US 8,867,788 B2
(45) Date of Patent: Oct. 21, 2014

(54) VEHICLE PERIPHERY MONITORING DEVICE

(75) Inventor: Yosuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 13/702,610

(22) PCT Filed: Jun. 30, 2011

(86) PCT No.: PCT/JP2011/065092
§ 371 (c)(1),
(2), (4) Date: Dec. 7, 2012

(87) PCT Pub. No.: WO2012/014627
PCT Pub. Date: Feb. 2, 2012

(65) Prior Publication Data
US 2013/0083968 A1   Apr. 4, 2013

(30) Foreign Application Priority Data
Jul. 29, 2010 (JP) ................................. 2010-170045

(51) Int. Cl.
| | | |
|---|---|---|
| *G06K 9/00* | (2006.01) | |
| *G06K 9/62* | (2006.01) | |
| *G06K 9/46* | (2006.01) | |
| *G08G 1/16* | (2006.01) | |
| *G06T 7/00* | (2006.01) | |
| *H04N 7/00* | (2011.01) | |

(52) U.S. Cl.
CPC ..... *G06K 9/6267* (2013.01); *G06T 2207/30261* (2013.01); *G06K 9/4604* (2013.01); *G08G 1/165* (2013.01); *G06K 9/00791* (2013.01); *G06T 7/0085* (2013.01)
USPC ............................. 382/103; 382/291; 348/119

(58) Field of Classification Search
CPC ................... G06K 9/00; H04N 7/00
USPC ......... 382/100, 103–107, 154–155, 162–168, 382/173, 181–199, 209, 224, 232, 254, 382/274–276, 287–294, 305, 312; 348/119, 348/118; 356/139.03
See application file for complete search history.

(56) References Cited

U.S. PATENT DOCUMENTS

| | | | | |
|---|---|---|---|---|
| 5,493,392 A | * | 2/1996 | Blackmon et al. | 356/139.03 |
| 6,285,393 B1 | * | 9/2001 | Shimoura et al. | 348/119 |

(Continued)

FOREIGN PATENT DOCUMENTS

| | | |
|---|---|---|
| EP | 1 898 357 A1 | 3/2008 |
| EP | 1 909 230 A1 | 4/2008 |

(Continued)

OTHER PUBLICATIONS

European Search Report dated Nov. 11, 2013, issued in counterpart European Patent Application.

(Continued)

*Primary Examiner* — Seyed Azarian
(74) *Attorney, Agent, or Firm* — Carrier Blackman & Associates, P.C.; Joseph P. Carrier; Jeffrey T. Gedeon (57) ABSTRACT

A vehicle periphery monitoring device includes: a first edge image generation element 5 which generates a first edge image on the basis of luminance components of a captured image acquired by an in-vehicle camera 2; a second edge image generation element 6 which generates a second edge image on the basis of hue components or saturation components of the captured image; a composite edge image generation element 7 which generates a composite edge image formed by combining the first edge image and the second edge image; and an object classification identification element 8 which identifies whether or not the object is a prescribed kind of structure on the basis of the external shape of the object represented by the composite edge image.

1 Claim, 4 Drawing Sheets

(56) References Cited

U.S. PATENT DOCUMENTS

| | | | |
|---|---|---|---|
| 6,546,118 B1* | 4/2003 | Iisaka et al. | 382/104 |
| 7,933,434 B2* | 4/2011 | Aoki et al. | 382/104 |
| 2009/0245582 A1* | 10/2009 | Sakamoto | 382/104 |

FOREIGN PATENT DOCUMENTS

| | | |
|---|---|---|
| EP | 2 000 979 A2 | 12/2008 |
| JP | 06-083962 A | 3/1994 |
| JP | 2001-145092 A | 5/2001 |
| JP | 3324821 B2 | 9/2002 |
| JP | 2005-285006 A | 10/2005 |
| JP | 2009-151602 A | 7/2009 |
| JP | 4358147 B2 | 11/2009 |
| JP | 2010-109451 A | 5/2010 |

OTHER PUBLICATIONS

Japanese Office Action issued Aug. 18, 2014 in the corresponding JP Patent Application 2012-526390.

Japanese Office Action issued Aug. 26, 2014 in the corresponding JP Patent Application 2012-526390.

\* cited by examiner

VEHICLE PERIPHERY MONITORING DEVICE

TECHNICAL FIELD

The present invention relates to a vehicle periphery monitoring device which detects an object existing outside a vehicle by using an in-vehicle camera.

BACKGROUND ART

There has been conventionally known a technique of acquiring a captured image of the periphery of a vehicle by using an in-vehicle camera and monitoring an object existing outside the vehicle on the basis of the captured image with the purpose of supporting vehicle driving.

For example, Patent Document 1 discloses a technique of calculating the three-dimensional position of an object existing ahead of a vehicle on the basis of a stereo image of the area ahead of the vehicle acquired using two in-vehicle cameras and detecting a white line on the road on which the vehicle is traveling and the position of a sidewall object on the basis of the three-dimensional position information.

In addition, for example, Patent Document 2 describes a technique of detecting stud-type lane marks such as Botts Dots, cat's eye, and the like on the basis of the shape of an object in a captured image acquired by an in-vehicle camera.

PRIOR ART DOCUMENTS

Patent Documents

Patent Document 1: Japanese Patent No. 3324821
Patent Document 2: Japanese Patent No. 4358147

SUMMARY OF THE INVENTION

Problems to be Solved by the Invention

When an object existing outside a vehicle is monitored on the basis of a captured image of the periphery of the vehicle, there sometimes arises a need for detecting a particular (prescribed type of) structure with the structure distinguished from other objects in some cases.

For example, when a travel section line such as a white line is detected from the captured image, there sometimes arises a need for identifying whether or not an object contained in the captured image is a pylon in order to prevent pylons arranged to indicate a construction area or the like on the road from being detected as a travel section line.

In this case, in the technique disclosed in Patent Document 1, a white line on the road surface is distinguished from a sidewall object on the basis of the height of an object. The technique in Patent Document 1, however, does not identify what kind of structure constitutes the sidewall object.

On the other hand, when the kind of an object in a captured image is identified, normally as described in Patent Document 2, the shape of the object in the captured image is detected and then the kind of the object is identified on the basis of the shape.

In the case of detecting the shape of the object as described above, there is generally known an approach of extracting a luminance edge as a discontinuous varying portion in the luminance on the basis of the luminance components of the captured image and then recognizing the shape of the object from the luminance edge.

The luminance edge as one indicating a visible outline (a boundary between an object and its surrounding background) of an object, however, is able to be extracted only when a luminance difference between an object and its surrounding background in the captured image remarkably occurs. Therefore, depending on the degree of exposure of an object to light or a hue between the object and its background, the luminance edge is able to be extracted only in a part of the visible outline of the object in many cases.

For example, in an environment in which one side surface of an object is exposed to light and its opposite side surface is shadowed, it is difficult to extract the luminance edge corresponding to the visible outline of the opposite side surface. Moreover, for example, when both of the object color and the background color around the object have dark hues, it is difficult to extract the luminance edge on the boundary between these colors.

Further, when the luminance edge is extracted only in a part of the visible outline of the object as described above, the external shape of the object is not able to be recognized correctly. Therefore, the technique has a disadvantage that the classification of the object is not able to be correctly identified.

The present invention has been made in view of the above background. Therefore, it is an object of the present invention to provide a vehicle periphery monitoring device capable of increasing the accuracy of identifying the kind of an object in a captured image acquired by an in-vehicle camera.

Means for Solving the Problems

In order to achieve the above object, the present invention provides a vehicle periphery monitoring device which detects an object existing outside a vehicle on the basis of a captured image of an area in the periphery of the vehicle acquired by an in-vehicle camera, the device including: a first edge image generation element configured to extract a first edge as a discontinuous varying portion in a value of a luminance component from the captured image on the basis of the luminance components of the captured image and generates a first edge image which is composed of the extracted first edges; a second edge image generation element configured to extract a second edge as a discontinuous varying portion in a value of a hue component or a saturation component on the basis of the hue components or the saturation components of the captured image and generates a second edge image which is composed of the extracted second edges; a composite edge image generation element configured to generate a composite edge image formed by combining the generated first edge image and second edge image; and an object classification identification element configured to determine whether or not an external shape of the object represented by an object outline image which is an image constituting a visible outline of the object contained in the captured image in the generated composite edge image coincides with an external shape of a prescribed kind of structure and identifies whether or not the object is the prescribed kind of structure on the basis of at least the determination result.

In the present invention as described above, the first edge extracted from the captured image by the first edge image generation element is an edge extracted as a discontinuous varying portion in the value of the luminance component of the captured image (a part where the magnitude of the value of the luminance component varies relatively rapidly). Therefore, the first edge is extracted depending on the distribution of the luminance components of the captured image.

On the other hand, the second edge extracted from the captured image by the second edge image generation element is an edge extracted as a discontinuous varying portion in the value of the hue component or saturation component of the captured image (a part where the magnitude of the value of the hue or saturation component varies relatively rapidly). Therefore, the second edge is extracted depending on the distribution of the hue or saturation components of the captured image.

In this case, the distribution of the hue or saturation components of the captured image generally differs from the distribution of the luminance components of the captured image. This increases the probability that, even if a part is not extracted as the first edge in the visible outline of the object in the captured image, the part is extracted as a second edge. Moreover, contrary thereto, a part not extracted as the second edge in the visible outline of the object in the captured image may be extracted as a first edge.

Therefore, in the composite edge image which is formed by combining the first edge image and the second edge image by using the composite edge image generation element, the whole or many parts of the visible outline of the object contained in the captured image are included as the first edges or the second edges.

Accordingly, in the present invention, the object classification identification element determines whether or not the external shape of the object represented by an object outline image, which is an image constituting the visible outline of the object contained in the captured image in the generated composite edge image, coincides with the external shape of the prescribed kind of structure. Then, the object classification identification element identifies whether or not the object is the prescribed kind of structure on the basis of at least the determination result.

In this case, high reliability is obtained with respect to the external shape of the object represented by the object outline image. This increases the reliability of the determination result of whether or not the external shape of the object represented by the object outline image coincides with the external shape of the prescribed kind of structure. Therefore, according to the present invention, the accuracy of identifying the kind of an object in the captured image acquired by the in-vehicle camera is able to be increased.

In the present invention as described above, as the prescribed kind of structure, for example, there is a structure whose outer surface is sectioned into a plurality of colored areas by a plurality of boundaries extending in a horizontal or diagonal direction and in parallel to each other on the outer surface and in which the colored areas adjacent to each other with each boundary therebetween are colored in colors different from each other (for example, a pylon). Furthermore, in this case, preferably the object classification identification element determines that the object is the prescribed kind of structure in the case where the external shape of the object represented by the object outline image coincides with the external shape of the prescribed kind of structure, and a plurality of the first edges or second edges extending in a horizontal or diagonal direction and in parallel to each other are present inside the object outline image.

According thereto, the object is determined to be the prescribed kind of structure in the case where the external shape of the object represented by the object outline image coincides with the external shape of the prescribed kind of structure and there are the plurality of the first edges or second edges extending in the horizontal or diagonal direction and in parallel to each other inside the object outline image. Therefore, the accuracy of identifying whether or not the object is the prescribed kind of structure is able to be further increased.

MODE FOR CARRYING OUT THE INVENTION

One embodiment of the present invention will be described below with reference to FIG. 1 to FIG. 5.

Figure 1:
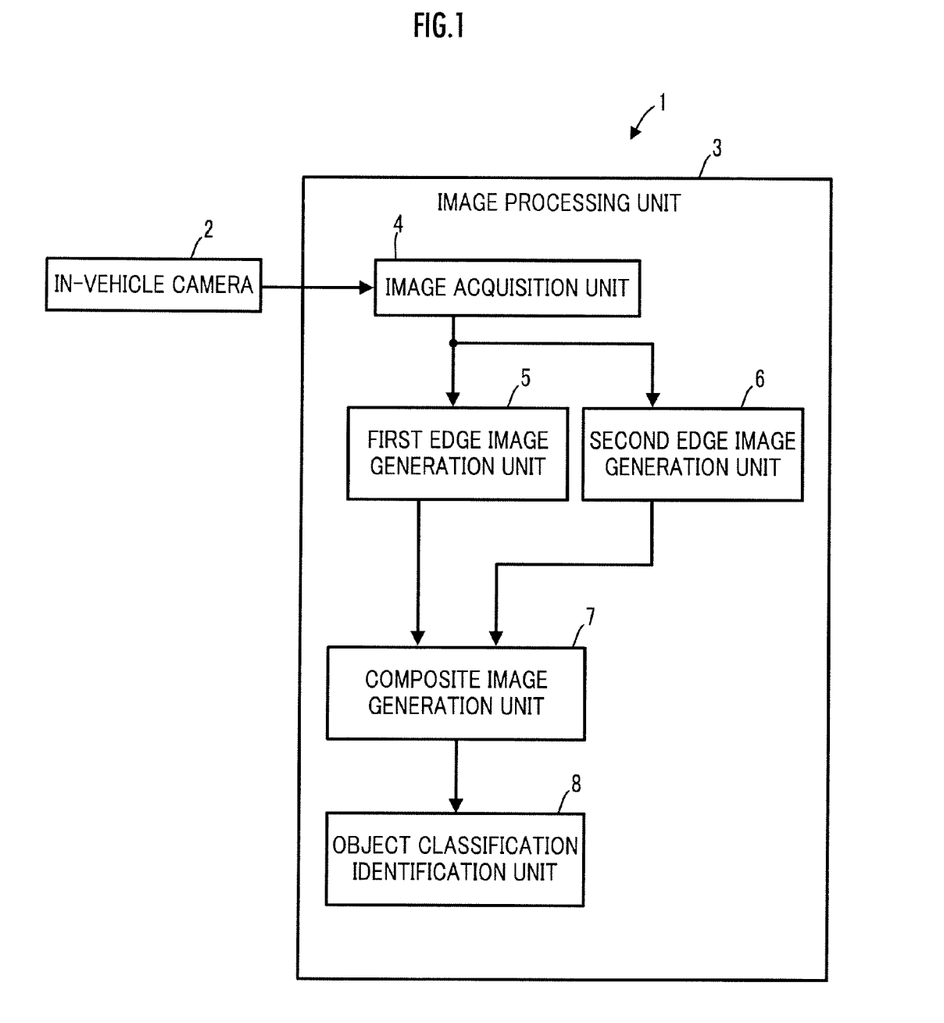
FIG. 1 is a block diagram illustrating the construction of an essential part of a vehicle periphery monitoring device in an embodiment of the present invention.

Referring to FIG. 1, a vehicle periphery monitoring device 1 according to this embodiment is mounted on a vehicle (not illustrated) and has an in-vehicle camera 2 and an image processing unit 3.

The in-vehicle camera 2 is mounted in the front part of the vehicle. In addition, the in-vehicle camera 2 captures an image of the area ahead of the vehicle. The in-vehicle camera 2 is formed of a CCD camera or the like. In this case, the in-vehicle camera 2 captures an image of the area ahead of the vehicle as a color image. Therefore, the in-vehicle camera 2 generates and outputs image signals of a color picture. In addition, the in-vehicle camera 2 may be a camera which captures an image of the area behind or lateral to the vehicle.

The image processing unit 3 is an electronic circuit unit including a CPU, a RAM, a ROM, an interface circuit, and the like, which are not illustrated. In addition, the image processing unit 3 receives inputs of image signals of a color picture generated by the in-vehicle camera 2.

The image processing unit 3 includes an image acquisition unit 4, a first edge image generation unit 5, a second edge image generation unit 6, a composite image generation unit 7, and an object classification identification unit 8, as functions implemented by executing an installed program.

Hereinafter, the global processing of the image processing unit 3 will be described in detail, including the processing of the functional units of the image processing unit 3.

The image signals of the color picture generated by the in-vehicle camera 2 are received by the image acquisition unit 4 of the image processing unit 3 at predetermined arithmetic processing cycles. The image acquisition unit 4 converts an image signal (an image signal for each pixel) which is an analog signal input from the in-vehicle camera 2 to digital data and then stores the digital data in an image memory which is not illustrated.

More specifically, the image acquisition unit 4 stores a luminance component image, which is obtained by converting the luminance components of the image signals of the input color picture to digital data, and the hue components or the saturation components of the image signals such as, for example, a hue component image obtained by converting the hue components to digital data. This causes the luminance component image as luminance components (an image in which the value of each pixel is the value of a luminance component) of the captured image acquired by the in-vehicle camera 2 and the hue component image as hue components (an image in which the value of each pixel is the value of a hue component) to be stored into the image memory.

The aforementioned luminance component image and hue component image are given to the first edge image generation unit 5 and the second edge image generation unit 6, respectively. Then, the processes of the first edge image generation unit 5 and the second edge image generation unit 6 are subsequently performed. The first edge image generation unit 5 and the second edge image generation unit 6 have functions of a first edge image generation element and a second edge image generation element in the present invention.

The first edge image generation unit 5 to which the luminance component image is given performs the processing of a well-known edge extraction filter such as a differential filter for the luminance component image. Thereby, the first edge image generation unit 5 extracts a first edge as a discontinuous varying portion in the value of a luminance component (a portion in which the value of the luminance component varies relatively rapidly) in the captured image. Furthermore, the first edge image generation unit 5 generates a first edge image which is an image (binarized image) composed of the first edge. Then, the first edge image generation unit 5 stores the first edge image into an image memory which is not illustrated.

Moreover, the second edge image generation unit 6 to which the hue component image is given performs the same processing as the edge extraction filter described above for the hue component image. Thereby, the second edge image generation unit 6 extracts a second edge as a discontinuous varying portion in the value of a hue component (a portion in which the value of the hue component varies relatively rapidly) in the captured image. Furthermore, the second edge image generation unit 6 generates a second edge image which is an image (binarized image) composed of the second edge. Then, the second edge image generation unit 6 stores the second edge image into the image memory which is not illustrated.

Figure 2:
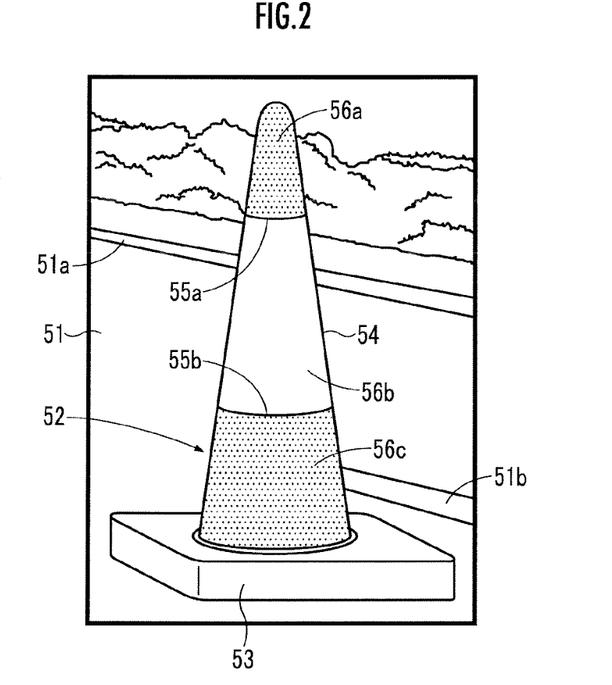
FIG. 2 is a diagram illustrating an example of a captured image containing a prescribed kind of object (pylon)
Figure 3:
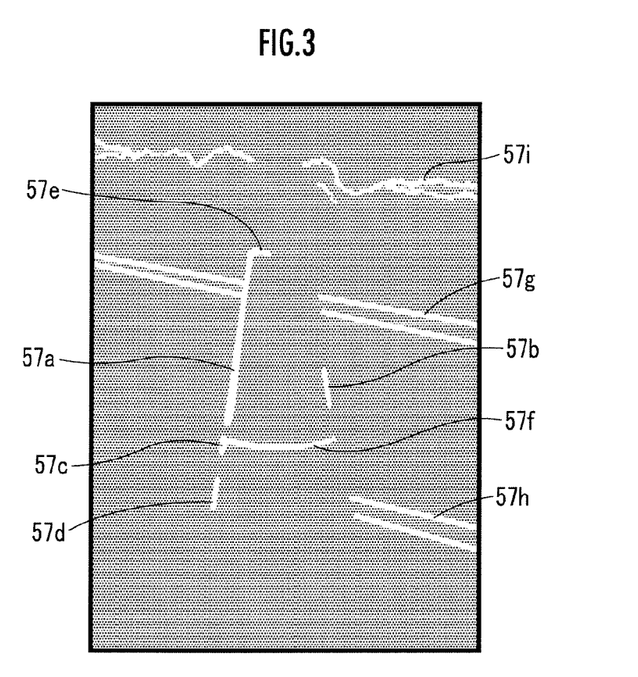
FIG. 3 is a diagram illustrating an example of a first edge image obtained from the captured image of FIG. 2.
Figure 4:
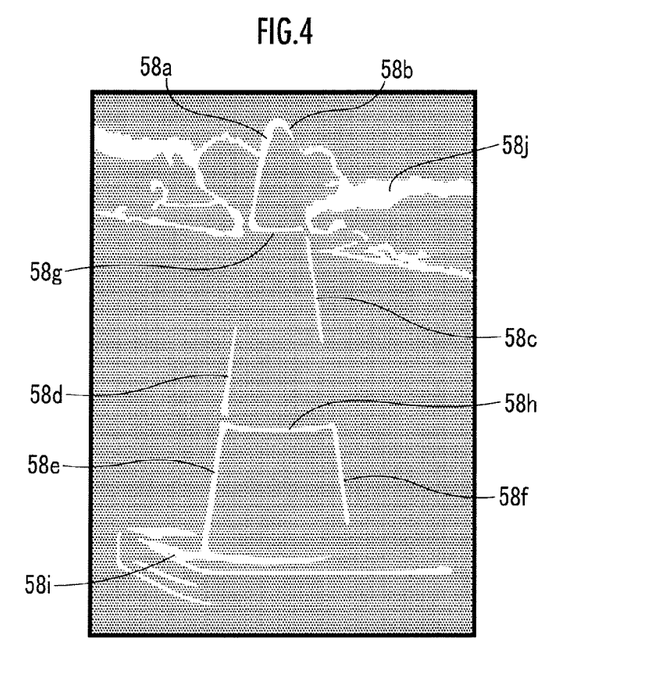
FIG. 4 is a diagram illustrating an example of a second edge image obtained from the captured image of FIG. 2.

Here, there are illustrated an example of a captured image acquired by the in-vehicle camera 2 and examples of the first edge image and the second edge image described above which are obtained from the captured image in FIG. 2 to FIG. 4.

Referring to FIG. 2, there is illustrated an example of the captured image acquired by the in-vehicle camera 2. In this example, an image of a pylon 52 placed on the road 51 and the periphery of the pylon 52 is captured. The illustrated pylon 52 is a structure having a base 53 and a conically-shaped main body 54 (cone portion) which is provided in a protruding manner on the base 53. The parts denoted by reference numerals 51a and 51b represent white lines on the road 51.

In this case, the outer surface of the main body 54 of the pylon 52 is colored in two colors, red and white. More specifically, the outer surface of the main body 54 is vertically sectioned into a plurality of (three in the illustrated example) colored areas 56a, 56b, and 56c by a plurality of (two in the illustrated example) boundaries 55a and 55b which extend in a horizontal direction and in parallel to each other on the outer surface. The boundaries 55a and 55b are annular lines coaxial with the main body 54.

Furthermore, the top colored area 56a and the bottom colored area 56c, which are colored areas stippled in FIG. 2, are colored in red and the middle colored area 56b located between these colored areas 56a and 56c is colored in white. Therefore, the colored areas (56a, 56b) adjacent to each other with the boundary 55a therebetween and the colored areas (56b, 56c) adjacent to each other with the boundary 55b therebetween are colored in colors different from each other. The color of the base 53 of the pylon 52 is black or a color close thereto.

Referring to FIG. 3, there is illustrated an example of the first edge image generated by the first edge image generation unit 5 from the captured image illustrated in FIG. 2. White portions in FIG. 3 represent the extracted first edges. In this example, a part of the visible outline of the main body 54 of the pylon 52 in the captured image of FIG. 2 is extracted as a first edge indicated by reference numerals 57a, 57b, 57c, and 57d. Moreover, the boundaries 55a and 55b of the main body 54 of the pylon 52 are extracted as a first edge indicated by reference numerals 57e and 57f.

In this case, the white colored area 56b (particularly, on the side exposed to light) of the main body 54 of the pylon 52 is likely to have a luminance difference from the road 51 or from the red colored areas 56a and 56c relatively remarkably. Therefore, the visible outline of the main body 54 in the white colored area 56b and the most part of the boundaries 55a and 55b are extracted as the first edges 57a to 57f.

On the other hand, the red colored areas 56a and 56c of the main body 54 and the base 53 of the pylon 52 are less likely to have luminance differences from the road 51. This makes it difficult to extract the visible outline of the main body 54 and the visible outline of the base 53 in the red colored areas 56a and 56c as first edges.

The first edges indicated by reference numerals 57g and 57h in FIG. 3 are first edges corresponding to white lines 51a and 51b on the road 51. Moreover, a first edge indicated by a reference numeral 57i is extracted from the image of a tuft of grass or the like which is lateral to the road 51.

FIG. 4 illustrates an example of a second edge image which is generated by the second edge image generation unit 6 from the captured image illustrated in FIG. 2. The white portions in FIG. 4 represent the extracted second edges. In this example, a part of the visible outline of the main body 54 of the pylon 52 in the captured image of FIG. 2 is extracted as second edges indicated by reference numerals 58a, 58b, 58c, 58d, 58e, and 58f. Further, the boundaries 55a and 55b of the main body 54 of the pylon 52 are extracted as second edges indicated by reference numerals 58g and 58h.

In this case, the red colored areas 56a and 56c of the main body 54 of the pylon 52 are likely to have hue differences from the road 51 or from the white colored area 56b relatively remarkably. Therefore, the visible outline of the main body 54 in the red colored area 56a and 56c and the most part of the boundaries 55a and 55b are extracted as second edges.

On the other hand, the white colored area 56b of the main body 54 of the pylon 52 is less likely to have a hue difference from the road 51. This makes it difficult to extract the visible outline of the main body 54 in the white colored area 56b as a second edge.

The second edge indicated by a reference numeral 58i in FIG. 4 is a first edge corresponding to the visible outline of the base 53 of the pylon 52. Moreover, the second edge indicated by a reference numeral 58j is a second edge extracted from the image of a tuft of grass or the like which is lateral to the road 51.

The first edge image and the second edge image generated and stored as described above are given to the composite image generation unit 7. Then, the processing of the composite image generation unit 7 is subsequently performed. The composite image generation unit 7 has a function of a composite edge image generation element in the present invention.

The composite image generation unit 7 generates a composite edge image (binarized image) by combining the first edge image with the second edge image (more specifically, combining the values of pixels corresponding to each other of both edge images). Then, the composite image generation unit 7 stores the composite edge image into the image memory which is not illustrated.

To be more precise, the composite image generation unit 7 sets the values of the pixels of the composite edge image (the values indicating whether or not an edge exists) according to the values of the pixels of the first edge image and the values of the pixels of the second edge image corresponding to the pixels. Specifically, for each pixel of the composite edge image, in the case where the value of the pixel of the first edge image corresponding to the pixel is a value indicating the existence of the first edge or the value of the pixel of the second edge image corresponding to the pixel is a value indicating the existence of the second edge, the composite image generation unit 7 sets the value of the pixel of the composite edge image to a value indicating that the edge exists in the position of the pixel.

Moreover, for each pixel of the composite edge image, in the case where the value of the pixel of the first edge image corresponding to the pixel is a value indicating that the first edge does not exist and the value of the pixel of the second edge image corresponding to the pixel is a value indicating that the second edge does not exist, the composite image generation unit 7 sets the value of the pixel of the composite edge image to a value indicating that no edge exists in the position of the pixel.

This generates a composite edge image which is composed of a combination of the first edge image and the second edge image. Therefore, in the composite edge image, a portion to be an edge is a part where at least one of the first edge and the second edge is extracted. Further, a portion not to be an edge is a part where neither of the first edge and the second edge is extracted. Hereinafter, an edge in the composite edge image is referred to as a composite edge.

Figure 5:
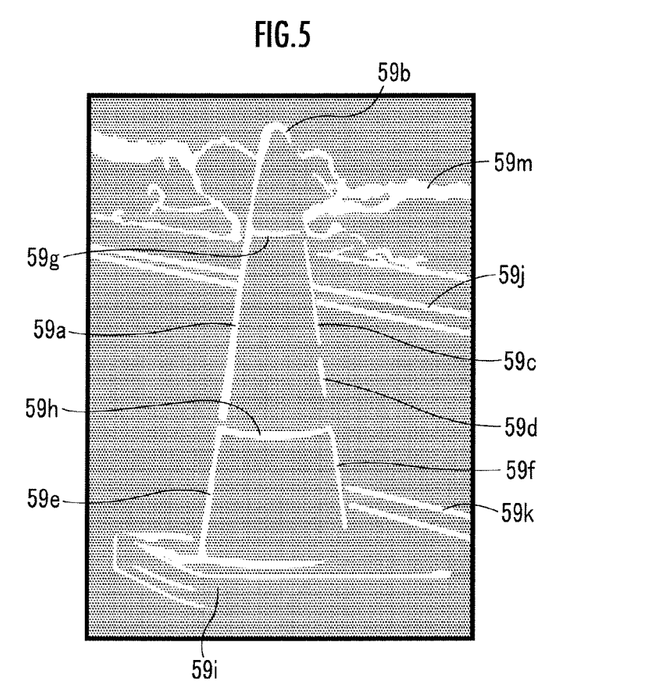
FIG. 5 is a diagram illustrating an example of a composite edge image obtained by combining the first edge image of FIG. 3 with the second edge image of FIG. 4.

FIG. 5 illustrates an example of a composite edge image generated as described above. This illustrated example is a composite edge image which is formed by combining the first edge image and the second edge image illustrated in FIG. 3 and FIG. 4, respectively. In this case, a part of the visible outline of the main body 54 of the pylon 52 in the captured image of FIG. 2 is represented by composite edges indicated by reference numerals 59*a*, 59*b*, 59*c*, 59*d*, 59*e*, and 59*f*. Moreover, the boundaries 55*a* and 55*b* of the main body 54 of the pylon 52 are represented by composite edges indicated by reference numerals 59*g* and 59*h*.

A composite edge indicated by a reference numeral 59*i* in FIG. 5 is a composite edge corresponding to the visible outline of the base 53 of the pylon 52. Moreover, composite edges indicated by reference numerals 59*j* and 59*k* are composite edges corresponding to the white lines 51*a* and 51*b* on the road 51. In addition, a composite edge indicated by a reference numeral 59*m* is a composite edge corresponding to the image of a tuft of grass or the like lateral to the road 51.

The composite edge image generated and stored as described above is given to the object classification identification unit 8. Then, the processing of the object classification identification unit 8 is subsequently performed. The object classification identification unit 8 has a function of an object classification identification element in the present invention.

The object classification identification unit 8 identifies whether or not an object contained in the captured image acquired by the in-vehicle camera 2 is a prescribed kind of structure.

In this case, the pylon 52 having the structure illustrated in FIG. 2 is assumed to be one of the prescribed kind of structures described above in this embodiment. Moreover, the object classification identification unit 8 has a function of identifying whether or not the object contained in the captured image acquired by the in-vehicle camera 2 is the same kind of object as the pylon 52 having the structure illustrated in FIG. 2.

The processing of the object classification identification unit 8 is performed as described below. Specifically, the object classification identification unit 8, first, extracts composite edges to be components of the same object (hereinafter, referred to as object component composite edges) from the given composite edge image.

In this case, in the case where a distance to the object within the captured area of the in-vehicle camera 2 is able to be detected on the basis of, for example, a stereo image, radar, or the like, the object classification identification unit 8 extracts composite edges contained in an area having almost the same distance. This enables an extraction of the composite edges to be components of the same object (object component composite edges).

In the example of the composite edge image illustrated in FIG. 5, the composite edges 59*a* to 59*i* are extracted as object component composite edges.

Subsequently, the object classification identification unit 8 determines whether or not the external shape (two-dimensional external shape) of an object represented by object component composite edges, which correspond to the visible outline of the object, among the extracted object component composite edges coincides with the external shape of the pylon 52 (hereinafter, referred to as shape determination).

In this shape determination, the object classification identification unit 8 connects object component composite edges corresponding to the visible outline of the object (the edges correspond to the object outline image in the present invention, and hereinafter the edges are referred to as object outline composite edges) among the object component composite edges. Thereby, the object classification identification unit 8 creates an image indicating the external shape of the object. In addition, the object classification identification unit 8 determines whether or not the shape of the image coincides with the external shape of the pylon 52 by comparing the shape of the image with a preset shape pattern as one representing the external shape of the pylon 52.

In this case, in the case where the image representing the external shape of the object has, for example, a shape approximate to an isosceles triangle having an apex angle within a certain angle range, the object classification identification unit 8 determines that the shape of the image coincides with the external shape of the pylon 52.

In an example of the composite edge image illustrated in FIG. 5, the composite edges 59*a* to 59*f* among the object component composite edges 59*a* to 59*i* and the outer peripheral portion of the composite edge 59*i* are considered to be object outline composite edges. Furthermore, the shape of an image formed by combining these object outline composite edges is compared with a preset shape pattern as one representing the external shape of the pylon 52. Then, in this case, the shape of the image is determined to coincide with the external shape of the pylon 52. Therefore, the determination result of the aforementioned shape determination is affirmative.

Moreover, the object classification identification unit 8 determines whether or not a plurality of object component composite edges extending in a horizontal direction and in parallel to each other (hereinafter, referred to as intra-object horizontal composite edges) exist inside the object outline composite edges (an area enclosed by the object outline composite edges) among the object component composite edges (hereinafter, referred to as pattern determination). In addition, the intra-object horizontal composite edges do not need to extend exactly in the horizontal direction. The intra-object horizontal composite edges may extend in a direction inclined to the horizontal direction within a predetermined angle range close to zero.

In an example of the composite edge image illustrated in FIG. 5, the composite edges 59*g* and 59*h* among the object component composite edges 59*a* to 59*i* are extracted as intra-object horizontal composite edges. Then, in this case, it is determined that a plurality of intra-object horizontal composite edges which extend in the horizontal direction and in parallel to each other exist inside the object outline composite edges. Therefore, the determination result of the aforementioned pattern determination is affirmative.

When the determination result of the shape determination is negative, the execution of the pattern determination may be omitted.

After performing the shape determination and pattern determination as described above, the object classification identification unit 8 identifies whether or not the kind of the object in the captured image is the same as that of the pylon 52 on the basis of these determination results.

Specifically, when the determination results of the shape determination and the pattern determination are both affirmative, the object classification identification unit 8 identifies that the kind of the object in the captured image is the same as that of the pylon 52. Moreover, when the determination result of either the shape determination or the pattern determination is negative, the object classification identification unit 8 identifies that the kind of the object in the captured image is different from that of the pylon 52.

In the example of the composite edge image illustrated in FIG. 5, the determination results of the shape determination and the pattern determination are both affirmative as described above. Therefore, it is identified that the kind of the object in the captured image acquired by the in-vehicle camera 2 as illustrated in FIG. 2 is the same as that of the pylon 52.

This completes the detailed description of the processing performed by the image processing unit 3 in this embodiment. According to this embodiment, it is identified whether or not the kind of the object in the captured image is the same as that of the pylon 52 by using the composite edge image which is formed by combining the first edge image generated on the basis of the luminance components of the captured image acquired by the in-vehicle camera 2 and the second edge image generated on the basis of the hue components of the captured image.

In this case, the luminance components and the hue components of the captured image generally have distribution patterns different from each other. Thereby, edges not contained in the first edge image are contained in the second edge image as second edges or edges not contained in the second edge image are contained in the first edge image as first edges. Accordingly, the combination of the first edge image and the second edge image enables the generation of a composite edge image as an image where edges complement each other with respect to edges not extracted in each of the processing of the first edge image generation unit 5 and the processing of the second edge image generation unit 6. Specifically, the composite edge image is an image containing the most part of the visible outline of the object and the boundaries of the colored areas in the captured image as composite edges.

Moreover, the reliability of these determination results is able to be increased by performing the aforementioned shape determination and pattern determination using the composite edge image. Consequently, the kind of the object in the captured image is able to be identified with high reliability.

In addition, identification of whether or not the kind of the object in the captured image is the same as that of the pylon 52 is able to be performed with high reliability. Therefore, it is possible to prevent the image of the pylon 52 from being recognized as any other object or a white line or the like on the road through confusion. Consequently, it is possible to detect an object other than the pylon 52 or a white line on the road from the captured image with the object or the white line distinguished from the pylon 52.

Subsequently, some of the modifications of the above-described embodiment will be described below.

In the above embodiment, the second edge image generation unit 6 generates the second edge image from the hue component image as the hue components of the captured image acquired by the in-vehicle camera 2. The second edge image, however, may be generated from the saturation component image as the saturation components of the captured image. Here, the saturation components of the captured image generally have a distribution pattern which is different from the distribution pattern of the luminance components of the captured image, similarly to the case of the hue components. Therefore, also when the second edge image is generated from the saturation component image, it is possible to obtain the same effect as the case of generating the second edge image from the hue component image.

Moreover, in this embodiment, it is identified whether or not the object in the captured image is the same kind of structure as the pylon 52 having the structure illustrated in FIG. 2. It is, however, possible to identify whether or not the kind of the object is the same as any other kind of pylon having a structure different from the pylon 52.

Figure 6:
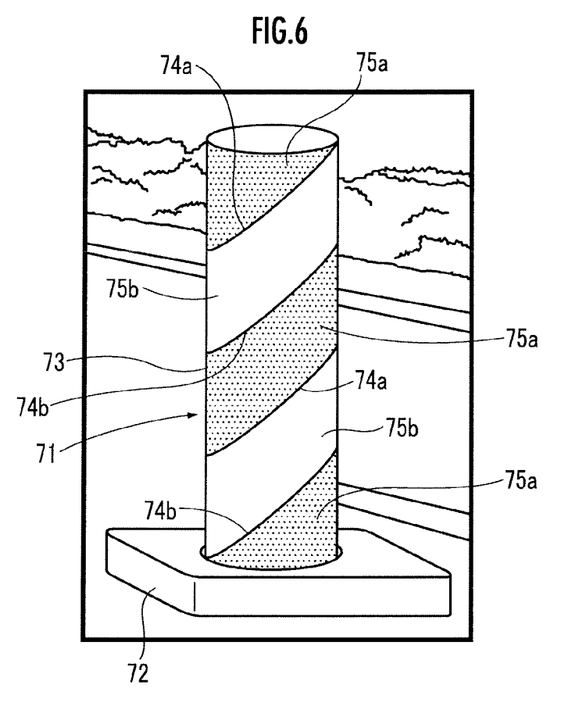
FIG. 6 is a diagram illustrating an example of a captured image containing a different kind of object (pylon) from the object of FIG. 2.
Figure 7:
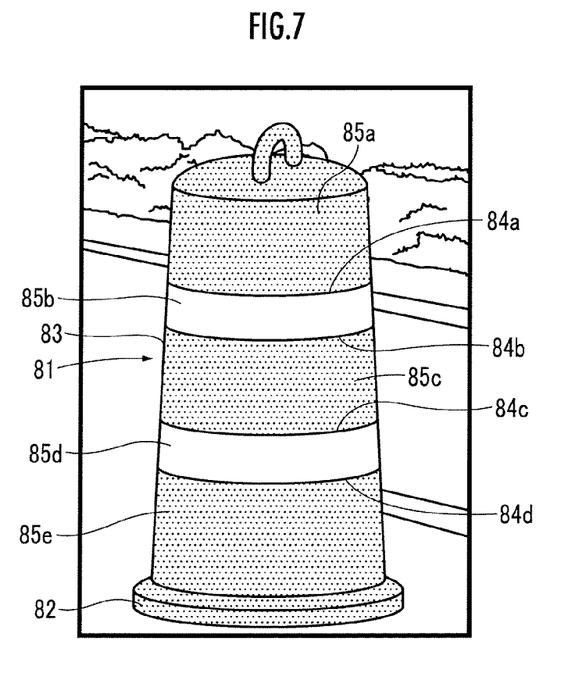
FIG. 7 is a diagram illustrating an example of a captured image containing a different kind of object (pylon) from the object of FIG. 2.

For example, the pylon of a kind to be identified may be a pylon 71 having a structure illustrated in FIG. 6 or a pylon 81 having a structure illustrated in FIG. 7.

The pylon 71 illustrated in FIG. 6 is a structure having a base 72 and a column-shaped main body 73 which is provided in a protruding manner on the base 72. The outer surface of the main body 73 of the pylon 71 is colored in two colors, red and white. More specifically, the outer surface of the main body 73 is sectioned into a plurality of (two in the illustrated example) colored areas 75*a* and 75*b* by a plurality of (two in the illustrated example) boundaries 74*a* and 74*b* which extend in a diagonal direction (spirally) and in parallel to each other on the outer surface.

In addition, the colored area 75*a*, which is a colored area stippled in FIG. 6, is colored in red, and the colored area 75*b*, which is adjacent to the colored area 75*a*, is colored in white.

When it is identified whether or not the object in the captured image acquired by the in-vehicle camera 2 is of the same kind as the pylon 71 illustrated in FIG. 6, the image processing unit 3 performs the processing of the image acquisition unit 4, the first edge image generation unit 5, the second edge image generation unit 6, and the composite image generation unit 7 in the same manner as the above embodiment.

Meanwhile, in the processing of the object classification identification unit 8, an image (an image representing the external shape of an object), which is formed by connecting the object outline composite edges among the object component composite edges in the composite edge image generated by the composite image generation unit 7, is compared with a preset shape pattern as one representing the external shape of the pylon 71. Thereby, the object classification identification unit 8 performs shape determination to determine whether or not the shape of the image coincides with the external shape of the pylon 71.

Furthermore, in the processing of the object classification identification unit 8, pattern determination is performed to determine whether or not a plurality of intra-object horizontal composite edges extending in a diagonal direction and in parallel to each other exist inside the object outline composite edges among the object component composite edges.

Thereafter, similarly to the above embodiment, when the determination results of the shape determination and the pattern determination are both affirmative, it is identified that the kind of the object in the captured image is the same as that of the pylon 71. In addition, when the determination result of either the shape determination or the pattern determination is negative, it is identified that the kind of the object in the captured image is different from that of the pylon 71.

Moreover, the pylon 81 illustrated in FIG. 7 is a structure having a base 82 and a barreled main body 83 provided in a protruding manner on the base 82. The outer surface of the main body 83 of the pylon 81 is colored in two colors, red and white. More specifically, the outer surface of the main body 83 is sectioned into a plurality of (five in the illustrated example) colored areas 85*a*, 85*b*, 85*c*, 85*d*, and 85*e* by a plurality of (four in the illustrated example) boundaries (loop lines) 84*a*, 84*b*, 84*c*, and 84*d* which extend in a horizontal direction and in parallel to each other on the outer surface.

Moreover, the colored areas 85*a*, 85*c*, and 85*e*, which are colored areas stippled in FIG. 6, are colored in red. Further, the colored area 85*b* between these red colored areas 85*a* and 85*c* and the colored area 85*d* between the red colored areas 85*c* and 85*e* are colored in white.

When it is identified whether or not the object in the captured image acquired by the in-vehicle camera 2 is of the same kind as the pylon 81 illustrated in FIG. 7, the image processing unit 3 performs the processing of the image acquisition unit 4, the first edge image generation unit 5, the second edge image generation unit 6, and the composite image generation unit 7 in the same manner as the above embodiment.

Meanwhile, in the processing of the object classification identification unit 8, an image (an image representing the external shape of an object), which is formed by connecting the object outline composite edges among the object component composite edges in the composite edge image generated by the composite image generation unit 7, is compared with a preset shape pattern as one representing the external shape of the pylon 81. Thereby, the object classification identification unit 8 performs shape determination to determine whether or not the shape of the image coincides with the external shape of the pylon 81.

Furthermore, in the processing of the object classification identification unit 8, pattern determination is performed to determine whether or not a plurality of intra-object horizontal composite edges extending in a horizontal direction and in parallel to each other exist inside the object outline composite edges among the object component composite edges.

Thereafter, similarly to the above embodiment, when the determination results of the shape determination and the pattern determination are both affirmative, it is identified that the kind of the object in the captured image is the same as that of the pylon 81. In addition, when the determination result of either the shape determination or the pattern determination is negative, it is identified that the kind of the object in the captured image is different from that of the pylon 81.

Moreover, in the processing of the object classification identification unit 8 in the above embodiment, the shape determination and the pattern determination are performed. In contrast, when only the shape determination is performed and the determination result of the shape determination is affirmative, it is possible to identify that the object in the captured image is of the same kind as the pylon 52 (or the pylon 71 or the pylon 81). When identifying the structure colored in a plurality of colors like the pylons 52, 71, and 81, it is desirable to perform the pattern determination in addition to the shape determination in order to increase the identification accuracy.

INDUSTRIAL APPLICABILITY

The present invention is useful as a device capable of accurately identifying the classification of an object existing outside a vehicle from a captured image acquired by an in-vehicle camera.

DESCRIPTION OF REFERENCE NUMERALS

1: Vehicle periphery monitoring device, 2: In-vehicle camera, 5: First edge image generation unit (first edge image generation element), 6: Second edge image generation unit (second edge image generation element), 7: Composite image generation unit (composite edge image generation element), 8: Object classification identification unit (object classification identification element), 52, 71, 81: Pylon (prescribed kind of structure)

The invention claimed is:

1. A vehicle periphery monitoring device which detects an object existing outside a vehicle on the basis of a captured image of an area in the periphery of the vehicle acquired by an in-vehicle camera, the device comprising:
 a first edge image generation element configured to extract a first edge as a discontinuous varying portion in a value of a luminance component from the captured image on the basis of the luminance components of the captured image and generates a first edge image which is composed of the extracted first edges;
 a second edge image generation element configured to extract a second edge as a discontinuous varying portion in a value of a hue component or a saturation component on the basis of the hue components or the saturation components of the captured image and generates a second edge image which is composed of the extracted second edges;
 a composite edge image generation element configured to generate a composite edge image formed by combining the generated first edge image and second edge image; and
 an object classification identification element configured to determine whether or not an external shape of the object represented by an object outline image which is an image constituting a visible outline of the object contained in the captured image in the generated composite edge image coincides with an external shape of a prescribed kind of structure and identifies whether or not the object is the prescribed kind of structure on the basis of at least the determination result, wherein:
 the prescribed kind of structure is a structure whose outer surface is sectioned into a plurality of colored areas by a plurality of boundaries extending in a horizontal or diagonal direction and in parallel to each other on the outer surface and in which the colored areas adjacent to each other with each boundary therebetween are colored in colors different from each other; and the object classification identification element determines that the object is the prescribed kind of structure in the case where the external shape of the object represented by the object outline image coincides with the external shape of the prescribed kind of structure, and there are a plurality of the first edges or the second edges extending in a horizontal or diagonal direction and in parallel to each other are present inside the object outline image.

* * * * *